(12) United States Patent
Brand et al.

(10) Patent No.: US 7,562,837 B2
(45) Date of Patent: Jul. 21, 2009

(54) COORDINATED CONTROL OF A WINCH AND A BRUSH CHIPPER

(75) Inventors: Ivan Brand, Holland, MI (US); John T. B. Bouwers, Pella, IA (US); Dale Messenger, Knoxville, IA (US); Scott A. Rempe, Pella, IA (US); Larry Schut, Pella, IA (US)

(73) Assignee: Vermeer Manufacturing Co., Pella, IA (US)

( * ) Notice: Subject to any disclaimer, the term of this patent is extended or adjusted under 35 U.S.C. 154(b) by 195 days.

(21) Appl. No.: 11/756,321

(22) Filed: May 31, 2007

(65) Prior Publication Data

US 2008/0296420 A1     Dec. 4, 2008

(51) Int. Cl.
*B02C 25/00*      (2006.01)
(52) U.S. Cl. .................. 241/28; 241/34; 241/37.5; 241/92; 241/101.2
(58) Field of Classification Search .............. 241/28, 241/101.2, 92, 242, 37.5, 34
See application file for complete search history.

(56) References Cited

U.S. PATENT DOCUMENTS

| | | |
|---|---|---|
| 6,138,932 A | 10/2000 | Moore |
| 6,446,889 B1 | 9/2002 | Moore |
| 7,044,409 B2 | 5/2006 | Stelter |

OTHER PUBLICATIONS 2-pages, from Applicants, disclosing prior art.

*Primary Examiner*—Mark Rosenbaum
(74) *Attorney, Agent, or Firm*—Sturm & Fix LLP

(57) ABSTRACT

A brush chipper with feed rollers and a winch has an interlock control with feed roller disabled position and a feed roller enabled position, spring loaded to the feed roller disabled position to encourage or require the use of the winch line to move it into a feed roller enable position. A winch control is provided that selects between a winch freewheel condition and winch drive condition. A connection is provided between the interlock control and winch control such that the interlock control automatically moves to the feed roller disabled position whenever the winch control is moved to the freewheel position.

7 Claims, 15 Drawing Sheets

COORDINATED CONTROL OF A WINCH AND A BRUSH CHIPPER

FIELD OF TECHNOLOGY

The present invention relates generally to coordination of controls for a winch and a brush chipper. More particularly, the present invention relates to a system that promotes safer operation of a winch for pulling large branches to a brush chipper used to grind the branches.

BACKGROUND

Brush chippers are well known machines for grinding brush, branches and limbs, to chips. It is also known to use a winch to pull bigger limbs to the machine, so that an operator does not need to move the branches entirely manually. Examples can be found in U.S. Pat. No. 6,138,932 to Moore, U.S. Pat. No. 6,446,889 to Moore and U.S. Pat. No. 7,044,409 to Stelter, et al., all three of which are incorporated herein by reference in their entirety.

Brush chippers use a feed mechanism to pull brush relatively slowly, and at a controlled rate into a high speed cutter mechanism that acts on the material, cutting and grinding it into small chips. The brush being processed by these machines is typically not preprocessed, other than having been cut into small enough pieces to fit into the feed mechanism, and is often contains many branches at various angles. This brush can snag the winch line. If the winch line is snagged by the brush and pulled into contact with the cutter mechanism, it will be damaged, and possibly the machine will be damaged, or the winch line itself may become a hazard. Thus, there is a need for a system that promotes coordinated used of the winch and the feed mechanism, to avoid this situation.

SUMMARY

The present invention relates to a brush chipper with feed rollers and a winch has an interlock control with feed roller disabled position and a feed roller enabled position, spring loaded to the feed roller disabled position to encourage or require the use of the winch line to move it into a feed roller enable position. A winch control is provided that selects between a winch freewheel condition and winch drive condition. A connection is provided between the interlock control and winch control such that the interlock control automatically moves to the feed roller disabled position whenever the winch control is moved to the freewheel position.

DETAILED DESCRIPTION OF THE INVENTION

Figure 1:
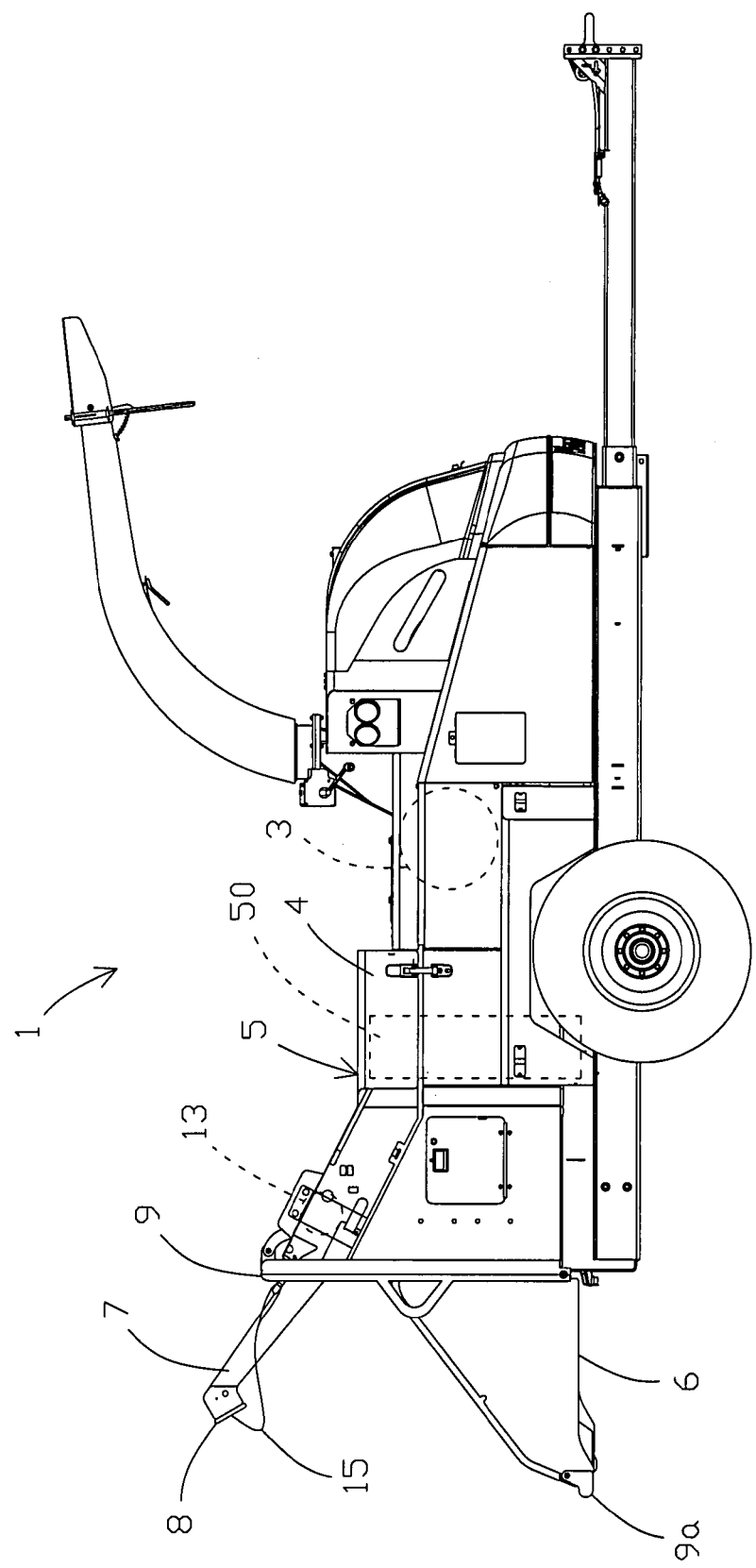
FIG. 1 is a side elevational view of a preferred embodiment of the present invention.

Referring now to the drawings wherein like reference numerals indicate identical or corresponding parts throughout the several views, FIG. 1 shows a brush chipper 1 constructed in accordance with the present invention.

FIG. 1 illustrates a wood chipper 1 constructed in accordance with the principles of the present invention. The wood chipper 1 includes a frame (e.g., a trailer structure), a cutter housing supported on the frame with a cutter mechanism 3 positioned within the cutter housing. A feed housing 4 is also supported on the frame. The feed housing encloses a feed mechanism 5 adapted for feeding a log 41 into the cutter mechanism 3. The feed housing 4 is located between the cutter mechanism 3 and a feed table 6 that extends outward from the feed housing 4. The feed table 6 is elevated above ground level and is positioned for supporting the log 41 as the log 41 is fed into the feed mechanism 5. The feed table 6 includes an outer edge located at a position distant or opposite from the feed housing 4. The wood chipper 1 also includes an elongated boom 7 that is mounted on the feed housing 4 and that extends over the feed table 6. The boom 7 works in combination with a winch 13. The winch 13 includes a flexible member 15 (e.g., a cable, rope, chain or other type of cable-like structure) that is supported over the feed table 6 by the boom 7. An end guide 8 is positioned adjacent to a free end of the boom 7. The flexible member 15 passes over the end guide 8 and separates from the boom 7 at a location directly adjacent to the end guide 8. By connecting the flexible member 15 to the log 41, the winch 13 can be used to drag the log 41 toward the feed table 6. The end guide 8 is preferably positioned such that when the winch 13 drags the log 41 toward the feed table 6, the boom 7 causes an end of the log 41 to be lifted by the flexible member 15 past the outer edge of the feed table 6 and onto a top surface (e.g., a platform or deck) of the feed table 6.

In FIG. 1, the cutter mechanism 3 is shown as a chipping or cutting drum. However, it will be appreciated that any type of cutting or chipping mechanism (e.g., a disk cutter) could also be used. Also, the feed mechanism 5 shown in FIG. 1 includes two vertical feed rollers 50 (only one shown). However, similar to the cutter mechanism 3, any type of feed mechanism 5 could be used. For example, a single feed roller, horizontal feed rollers, belts, or any other type of conveying mechanism could also be used. The feed mechanism 5 is controlled by a control bar 9 located adjacent to the feed table 6.

The feed table 6 is shown pivotally connected to the feed housing at a horizontal pivot axis, but it can also be fixed. The feed table 6 is typically pivoted up during transport of the wood chipper 1. The top surface of the feed table 6 is adapted for supporting the log 41 as the log 41 is fed into the feed mechanism 5.

Figure 9:
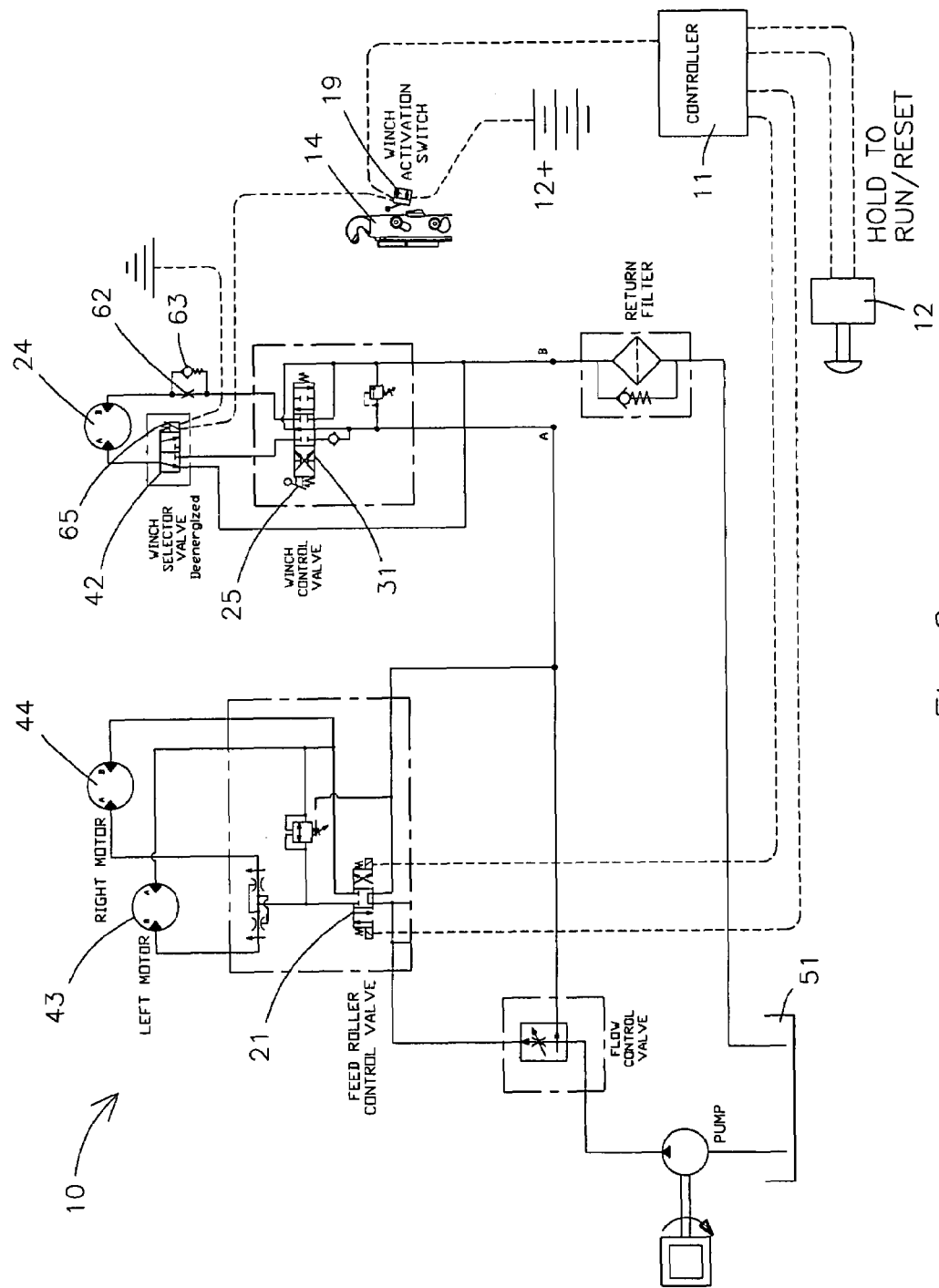
FIG. 9 is a schematic view of the control system and interlock of the present invention.
Figure 12:
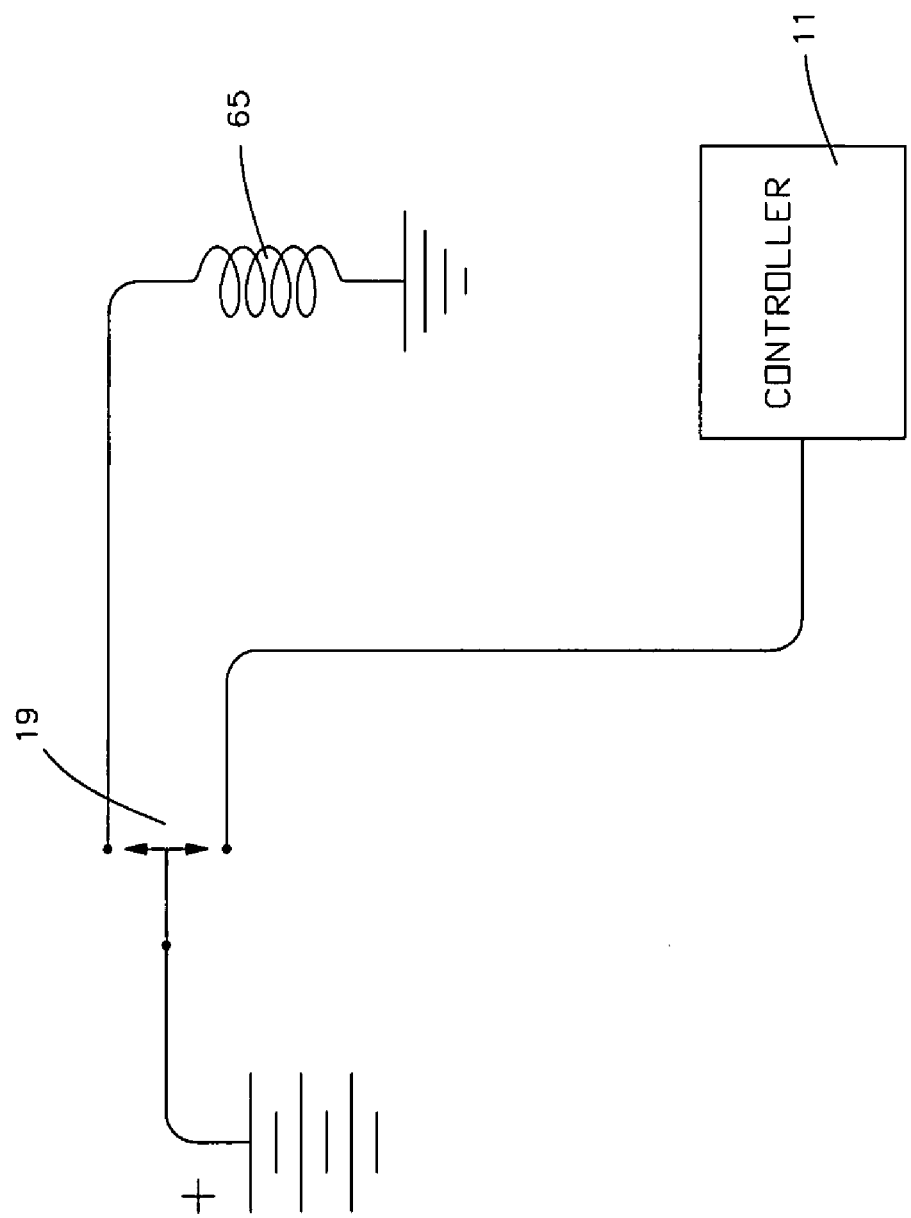
FIG. 12 is a schematic view of a battery and an interlock switch that connects power to either a winch solenoid valve or to a controller that controls the operation of the feed rollers.

Generally, here is how the interlock of the present invention works: There is an emergency stop that will be called an "e-stop" or "feedstop". This e-stop system, which is built into controller 11 of FIGS. 9 and 12, is on Vermeer Brush Chippers, for example as shown in U.S. Pat. No. 7,044,409 to Stelter, et al., so an operator can either activate it by pulling the upper bar or control bar 9 into the most rear position and that activates the e-stop; or the operator pushes a lower bar 9a which activates the e-stop to stop the feed rollers. So these are two ways to activate the e-stop, which stops the feed rollers 5.

The controller 11 shown in the schematic 10 shown in FIG. 9 knows when either event mentioned in the paragraph above happens and it stops the feed rollers so that no feeding can happen until a reset button 12 or "hold to run button" 12 has been manually reset. In the schematic of FIG. 9, this new invention runs right inline with that same circuit. As soon as the operator releases the rope 15 off of stop hook or winch engage/disengage lever 14 and pulls the handle 16 out as seen in FIG. 4, the e-stop system is activated.

Figure 2:
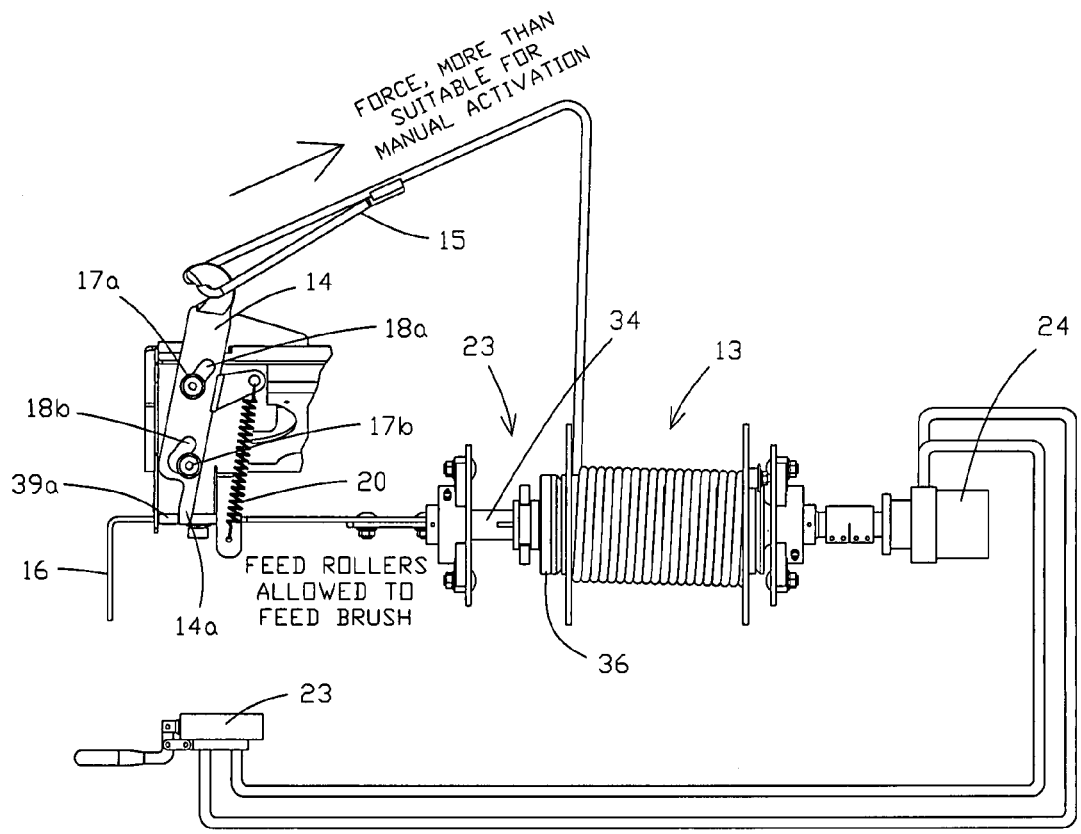
FIG. 2 is a top plan view of the winch and interlock system of the present invention in a position that will allow a main control system to operate feed rollers and showing a hydraulic motor for turning the winch with a forward and reverse valve and a winch clutch and clutch handle in an engaged position.
Figure 4:
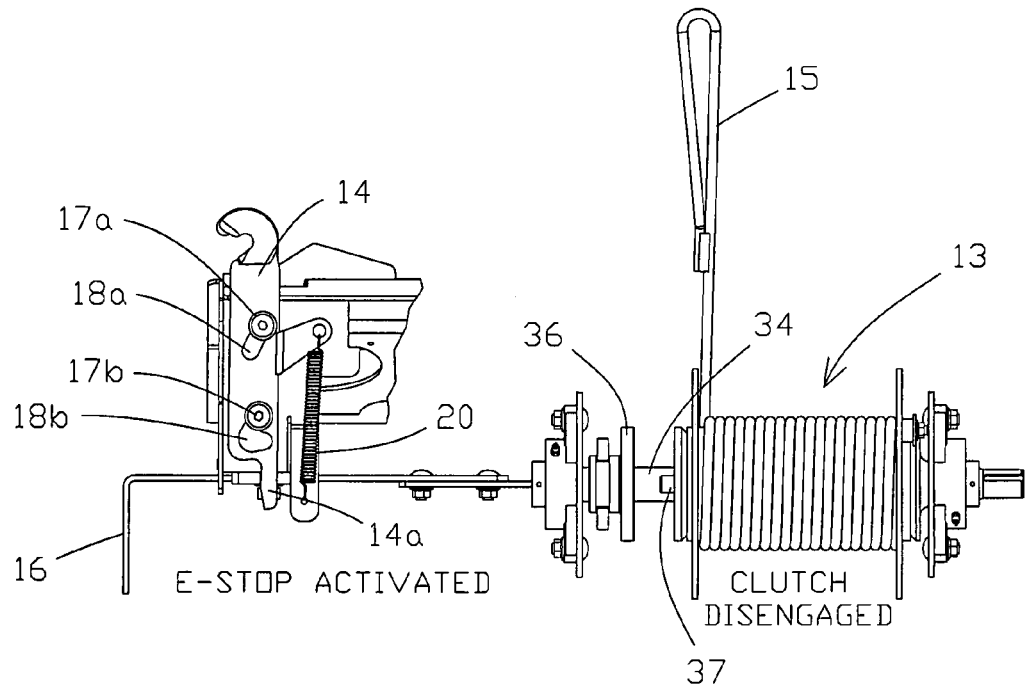
FIG. 4 is a top plan view of the winch and interlock system of the present invention as shown in FIG. 2 except that the interlock is released to a position wherein the main control system will not allow the feed rollers to operate (except with a hold to run button), wherein the winch motor is enabled but the winch clutch is disengaged.
Figure 8:
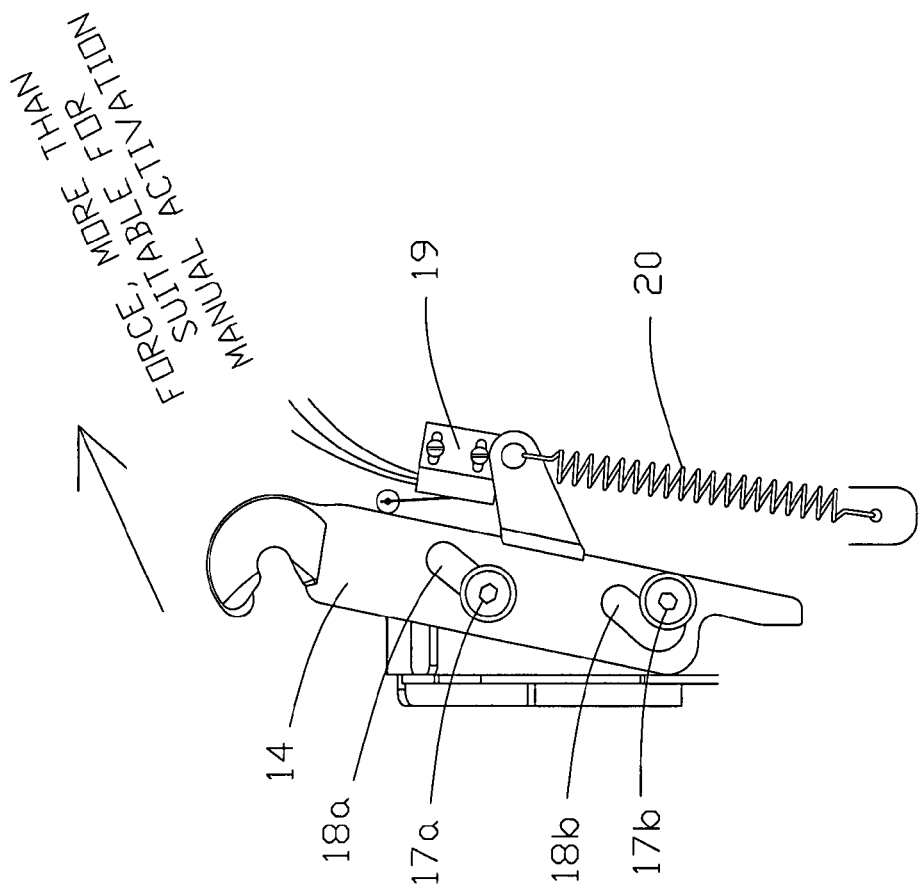
FIG. 8 is an enlarged top view of the interlock lever and switch shown in the position of FIG. 2.
Figure 7:
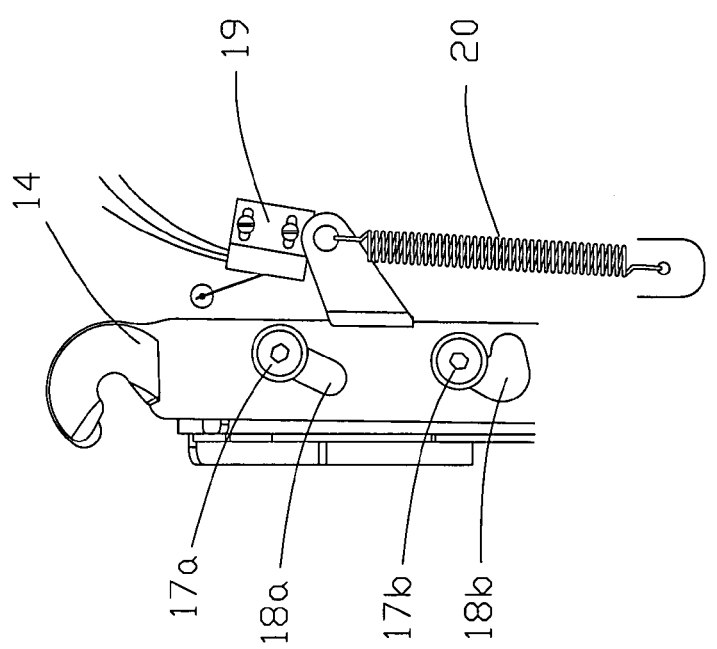
FIG. 7 is an enlarged top view of the interlock lever and switch shown in the position of FIG. 4.

When this main stop hook 14 is moved from the FIG. 2 to the FIG. 4 position, that trips the main mechanism including spring 17, pins 16 and slots 18 in stop hook 14 to the FIG. 4 position and automatically slides back and this switch 19, shown in FIGS. 7, 8 and 15 cuts electricity to the e-stop circuit which activates the stop. That automatically stops the feed rollers 5. There are also lights (not shown) that flash when the feed rollers are stopped.

When stop hook 14 is tripped from the FIG. 8 to the FIG. 7 position, stop hook 14 slides back to the FIG. 7 position, activating the e-stop system. The way the electronics work is that the e-stop system always has power going through all circuits, so the way the controller finds a fault is if there is no voltage. Then it goes into an e-stop, i.e., everything stops. The voltage that is normally run to the controller 11 runs through the switch 19. As soon as you trip stop hook 14, that activates the switch 19 which cuts electricity to the e-stop circuit, which activates the stop. The lights turn off and there are blinking lights that turn on as the feed rollers stop. Also the other side of that switch 19 now provides power for a solenoid valve 65.

In FIG. 9 the system is providing power to the switch 19, 12 volts, and the controller 11 is looking for that 12 volts. If it does not have it, the controller 11 automatically goes into a stop condition. In that case there would be no power going to the feed roller control valve 21 in FIG. 9. Also at that time there is a visible light that blinks, meaning that it is in a stop condition. The only time the operator can operate the winch 15 is when the light (not shown) is blinking indicating in a stop condition.

When the light is blinking the winch can be operated using handle 16 which operates a clutch 23 and control valve 23 controls the winch hydraulic motor 24. Electrically what happens then is that there is no voltage going to the controller 11, but on the other side of FIG. 9 power is being provided to the solenoid 25 of winch selector valve 31. What that does is it allows full function of the winch motor 24 to be able to turn in a pulling direction. The system is always running at full activation, whether there is a e-stop condition or not, i.e. there is always a reverse on the feed roller motors, and always a reverse on the winch motor, so that if something gets jammed, it can always be reversed out. There is always a reverse on both the feed roller motors and the winch motor 24. The reason is, looking at FIG. 2, when the interlock mechanism 14, 17, 19 and 20 to be locked in place had to be pulled in by the winch 15. When stop hook 14 is pulled in by the winch 13 that rope 15 gets taut. So, really there is no practical way to get that rope 15 off of hook 14. But you can use the clutch 23 to release the drum 13 to a free-rolling drum to prevent it from get locked so it cannot be unlocked. But because hook 14 is biased by the spring 20 to the position in FIG. 4, the hook 14 stays in that position until hook 14 is pivoted again by pulling it with the winch 13 to the position of FIGS. 2 and 8.

The clutch handle 16 would also have to be in to engage the winch 13 for the rope 15 to come in using the winch 13.

Figure 5:
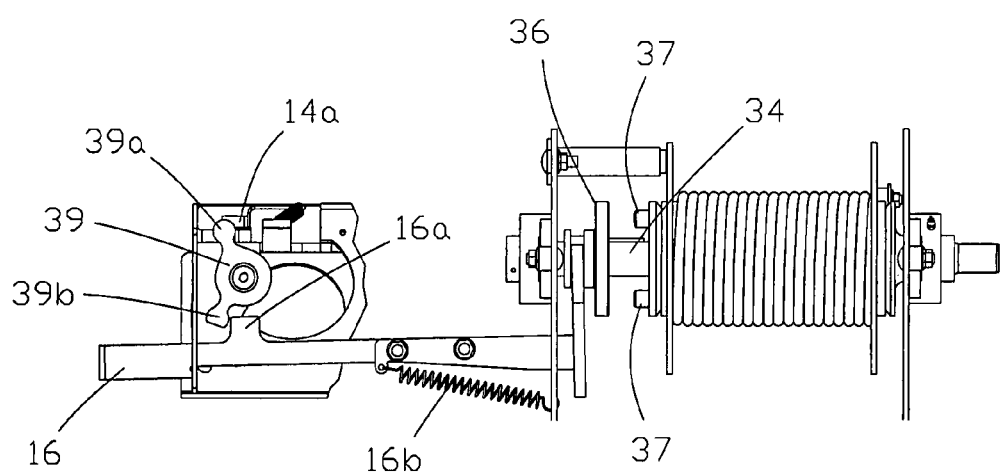
FIG. 5 is a is a side elevational view of the winch and interlock system in the position shown in FIG. 4.

With the clutch handle 16 out it allows the drum to run free as shown in FIGS. 4 and 5. The clutch 23 connects the hydraulic motor 24 and motor shaft 34 by plate 36 having two holes in it that receive pins 37. This hydraulic motor 24 is connected to a shaft 34 that runs through the spool 13. The reel of the winch 13 rotates on shaft 34 when the clutch is not engaged. When the plate 36 is in the FIG. 5 position with the handle 16 out and the plate 36 is spaced from pins 37, the shaft 34 rotates but it doesn't rotate the spool 13.

Figure 3:
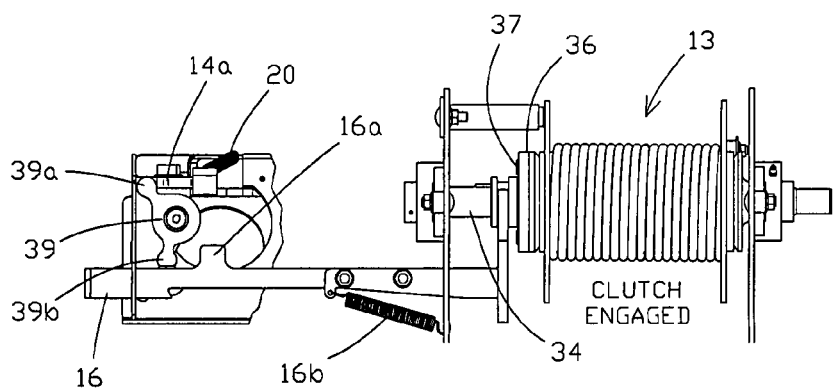
FIG. 3 is a side elevational view of the winch and interlock system in the position shown in FIG. 1.

But when you move the handle 16 in to the FIG. 3 position, the pins 37 go into the plate 36 so that when the motor 24 is rotating it rotates the shaft 34 and the spool 13, with the direction of rotation being dictated by the direction that control valve handle 23 is moved, either in forward or reverse.

It is all one assembly in FIGS. 2-5 so the pins 37, sometimes referred to as "dogs" get bound up because they are tight. The position in FIG. 2 is called the "home position", because when everything gets in that position the switch 19 (FIG. 8) stops the hydraulic motion but the rope 15 is taut. The rope 15 will not come off the end of the hook 14 in the FIG. 2 position. To get around this problem, the control valve 23 shown in FIG. 2 can be reversed for a half second by using the hold to run button 12 shown in FIG. 9, and that will allow loosening of the rope 15 enough to pull it off the hook 14. Once the rope 15 is pulled off the hook 14, then the handle 16 can be pulled out.

Looking at FIGS. 4 and 5, as the handle 16 is pulled out, the interlock system including hook 14 slides back to the FIGS. 4, 5 and 7 position, because the spring 20 biases hook 14 to the position shown in FIG. 4.

Figure 6:
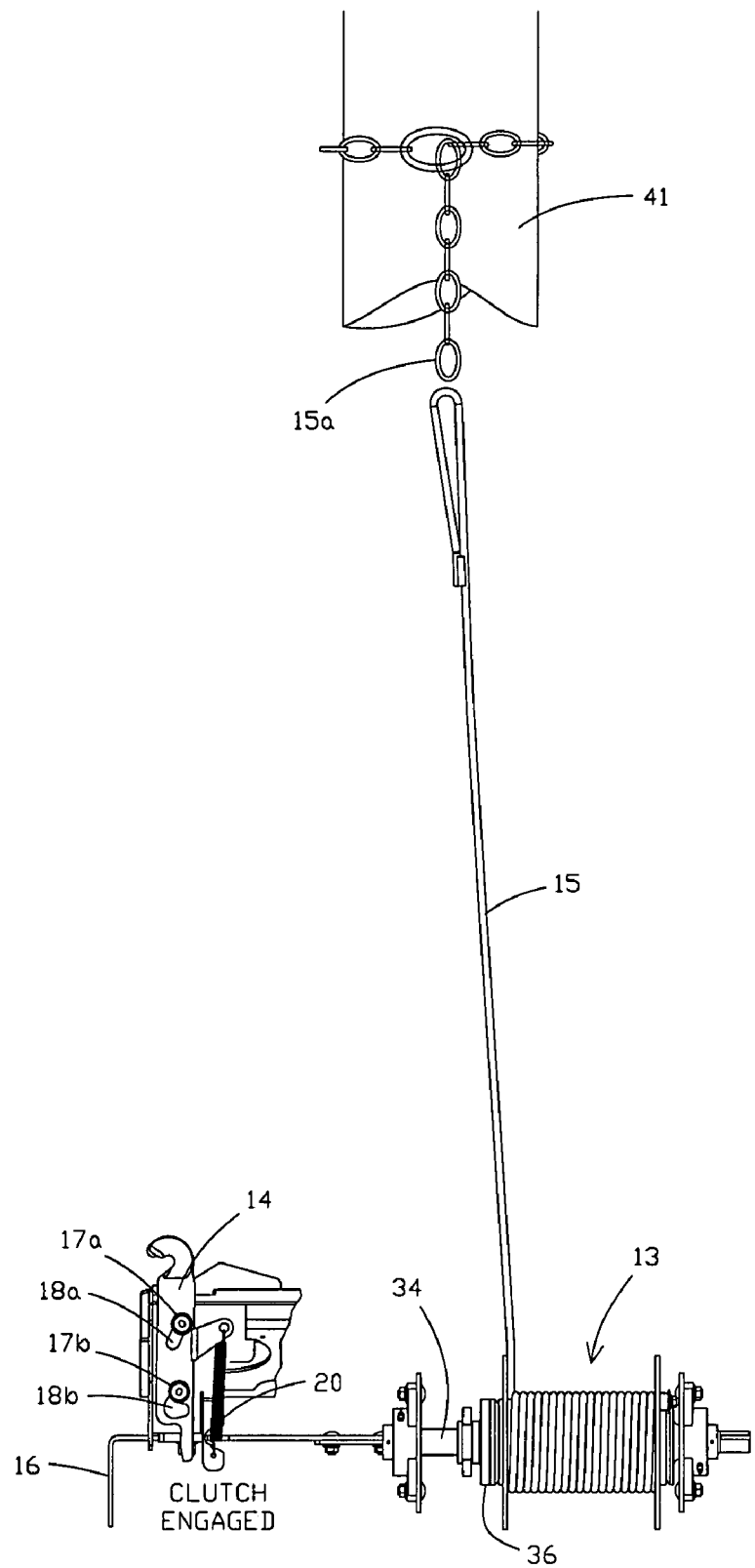
FIG. 6 is a top plan view showing the winch, the interlock and the winch line connected to a log.

In other words when rope 15 is removed from hook 14, the hook 14 trips out of its little cam 39 position and hook 14 slides back to the FIGS. 4 and 7 position. That allows the device to be in winch mode. As soon as that happens, the e-stop is activated and the winch 13 is enabled. Typically what happens, with the handle out 16, the operator can free-wheel the rope 15 out. So an operator would free-wheel or free spool the amount of rope 15 needed, put it on a log 41 as shown in FIG. 6 and then come back and slide the handle 16 back in.

FIG. 3 shows the winch mode in order to actually bring the log 41 in, i.e., with the handle in (FIG. 3) the pins 39 would be engaged with plate 36 and it would look like FIG. 4, where the interlock is still biased by spring 20 to the FIG. 4 position. The handle 16 can be used to trip it, via cam 39, and that brings it back. When you slide the handle 16 back in it does not do anything with the interlock 14 itself. The interlock mechanism 14 stays in the winch enabled mode.

Figure 3A:
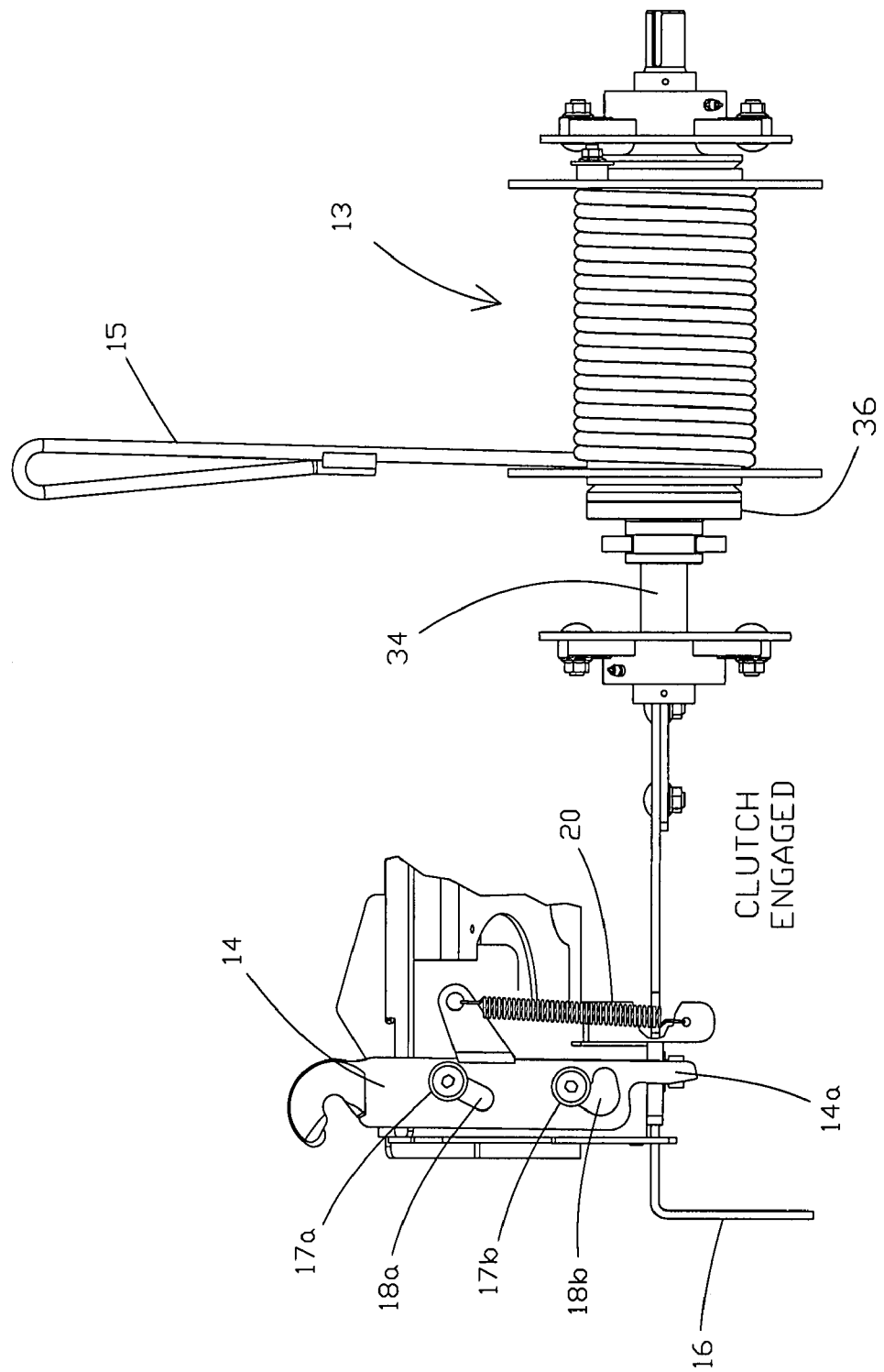
FIG. 3A is a side elevational view of the winch and interlock system in the position of FIG. 4 except that FIG. 3A is sort of a combination of FIGS. 3 and 4 wherein the winch clutch is engaged like in FIG. 3, but the interlock is winch engaged so that the winch with the rope can be used, as shown in FIG. 4 and the feed rollers are disengaged.

FIG. 3A is kind of a combination of FIGS. 3 and 4 where the clutch 23 is locked but the winch 13 with the rope 15 out. Then the operator comes back and puts the handle 16 in as shown in FIG. 3, and the interlock is going to look like FIG. 4, except the handle 16 is going to be in not like FIG. 4, showing the handle out. At that time that the winch selector valve 42 operates, because now, electrically, the selector valve 42 that is energized and enables operation of the winch 13 both in and out, however one pleases with the control valve 23 shown in FIG. 2. So you can get the tree 41 up on the machine and get it into the feed rollers by using the hold to run button 12, because the hold or run button 12 will still activate the feed roller motors 43 and 44 shown in FIG. 9 at all times irrespective of the position of the interlock lever 14.

Using the hold to run button 12 is manually controlled, i.e. the operator has to be there to do that. First, the operator will get the wood 41 started into the feed rollers, then the operator will disconnect the rope 15. Then the operator has to put the rope 15 on the end of the interlock mechanism hook 14 (FIG. 2) and the operator has to continue to roll in the rope 15 until hook 14 slides into place or snaps into place as in FIGS. 4 and 7. Then the winch 13 is automatically disconnected electrically so one can start feeding brush using the feed rollers 5. The reset or hold or run button 12 must be used first to get the log 41 to grab the log 41. Then the controller 11 can be used again to operate the system of FIG. 9 in the normal way that it is normally done, for example in the way explained in the aforementioned Moore patents.

During all of this time that the operator is using the winch 13 to pull wood 41 up onto the feed table, the feed rollers are stopped, but you can use the hold to run button 12 to grab the end of log 41 once it comes in contact with the feed rollers 5. See FIG. 3A, which is like FIG. 3, but also looks like the FIG. 4 position, but with the clutch 23 in the engaged position.

Before the rope 15 is un-spooled and the drum 13 itself is disengaged from the hydraulic motor 24 and shaft 34 and the handle 16 is back in the pins 37 are re-engaged so at that time the operator can operate the control valve 23 to either pull in or re-tract the rope 15 using the winch 13 controlled by hydraulic valve 23. At that particular time the winch interlock mechanism 14 is in a winched mode, which means it is biased back by the spring 29 to the FIG. 4 position.

Now looking at cam 39, in FIG. 3, the little ball 39a on top comes around and strikes this little small leg 14a on this interlock mechanism 14 and just trips hook 14 out of the position in FIGS. 2 and 8 to the tripped position in FIGS. 4 and 7.

The cam 39 just flutters until the operator pulls the handle 16 out. When the handle 16 is pulled out FIG. 3 shows that there is a piece 16a that will hit the bottom ball 39b. Part 39b pushes the bottom of that lever 16 as seen in FIG. 2 to the right and then the spring 20 pulls it down to this FIG. 4 position.

This function can be done either by cam 39 or by a small lever or rod (not shown), the point being that there are many different ways this can be done other than the preferred way shown in the drawings. Tripping the interlock system, including lever 14, means the system goes into the winch mode, i.e. going from the position in FIG. 2 to the position in FIG. 4. The only time an operator can actually run the feed roller motors 43 and 44 when configured in FIG. 2, when it is in the home position with the rope 15 taut and locked in the interlock into the feed mode is by using the hold to run button of FIG. 12 to pull the tree 41 to the feed rollers as shown in FIG. 6 by using the feed control bar, not shown.

Previous winches on Vermeer® brand brush chippers had to have the feed control bar in neutral. In this invention, the operator can leave the feed control bar 9 in forward because as soon as it goes into the winch mode it goes into an e-stop mode, which stops the feed rollers, taking a step out of the previous way of operating such Vermeer® brand brush chippers, making it easier on the operator. When the operator gets done and puts the winch back into the FIG. 2 home mode, the hook 14 is all snapped back in place. The operator then presses the hold or run button 12, and does not have to change the feed control bar 9 at all. So the operator is off and feeding brush, making it simpler by not inconveniencing the operator. Even though there two new steps, one of which is that the operator has to reverse the winch 13 just slightly before he can start, that is the only additional burden, and the second additional step is that the operator has to put the rope back on the hook 14 and put it into the home position of FIG. 2 before the operator can control the feed rollers 5 with the feed control bar 9.

There is a winch control valve 23 that always has fluid and power going to it, but on the forward side, that is where this invention controls what happens to that oil, on the winch selector valve 42 of FIG. 9. So if the operator is not in winch mode, oil going from the winch control valve 31 doesn't go anywhere. When you use reverse (retract), the oil can go back through, it goes around then back down to the tank 51, that is how an operator can reverse the winch under those circumstances. Normally the oil would go back through the winch control valve 31, and then back to tank 51. To allow that for reverse, it is actually allowed to free-flow back through a special line that goes back to tank 51. Once the solenoid 25 is energized, the oil goes through the winch control valve 31 of FIG. 9 and the winch selector valve 42 slides over, giving the operator full control of the winch 24.

The cam 39 allows the operator to be able to start in a winch mode. The typical use of a brush chipper has always been that the operator has to pull the handle 16 out, to be able to pull the rope 15 out. That has not changed from previous models. That causes the system to automatically go into a winch mode. Then the interlock system including hook 14 moves back, like in FIG. 4, and the switch 17 is tripped so it is in winch mode. The handle portion 16 has not changed, it is still the same to the operator and the control valve 23 is still the same. The present invention is really just controlling where the end of that rope 15 is at in order to allow the feed rollers to operate when not using the hold to run button 12. The hook 14 or engaged/disengaged lever 14 on the interlock can be moved manually if absolutely necessary, but it is designed intentionally to be difficult to move it manually. It is very inconvenient so that an operator is encouraged to use the interlock system as it was intended. But if the rope 15 were to break or the hydraulics or the winch were to fail, a person could move hook 14 over from the FIG. 7 to the FIG. 8 position manually to fix the problem.

Figure 14:
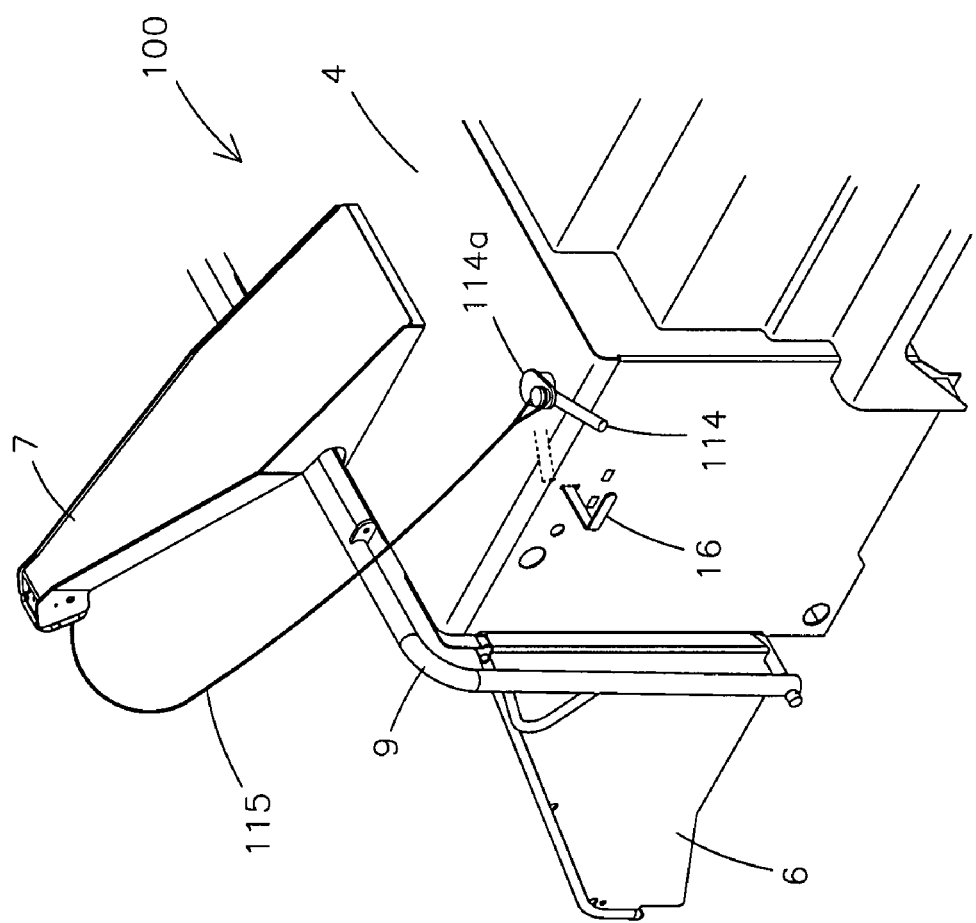
FIG. 14 is a perspective view of an alternate embodiment of the present invention showing a winch boom, winch line and interlock mechanism.
Figure 15A:
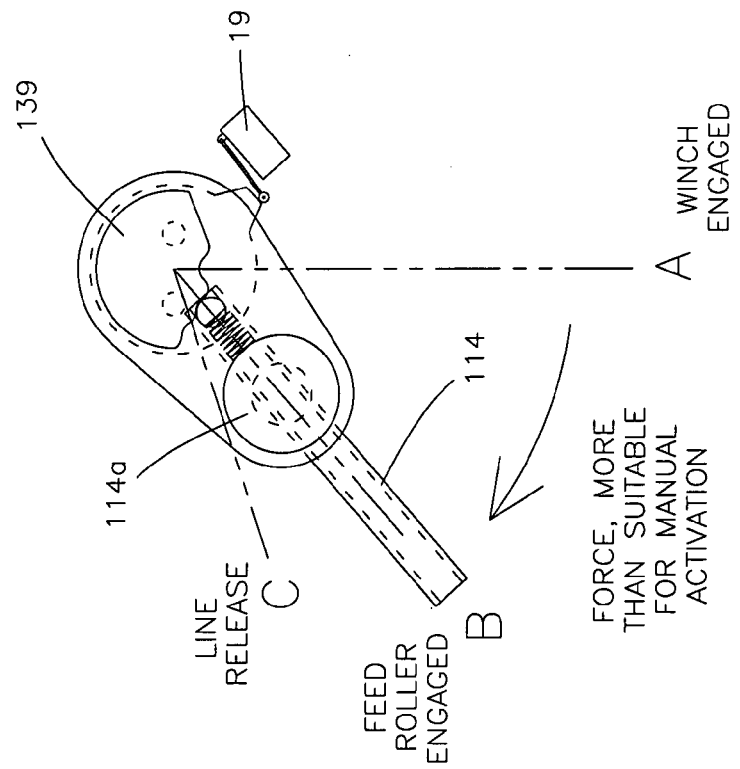
FIG. 15A is a top plan view of the interlock of FIG. 9, and further showing in dashed lines and words the various positions of the interlock mechanism, shown in solid lines in the winch engaged position thereof.
Figure 15B:
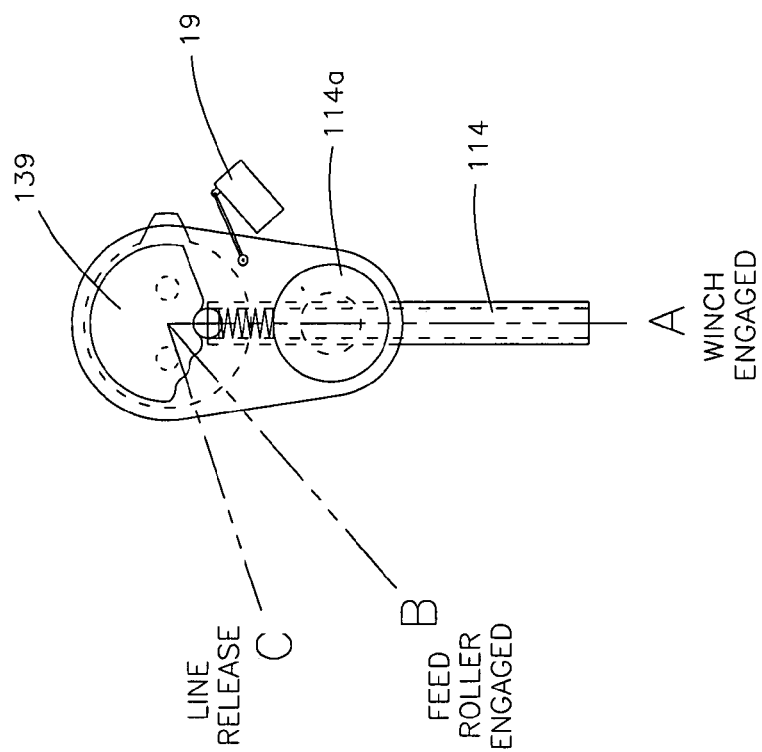
FIG. 15B is a top plan view of the interlock of FIG. 9, and further showing in dashed lines and words the various positions of the interlock mechanism, shown in solid lines in the feed roller engaged position thereof.

FIGS. 14, 15A and 15B show an alternate embodiment 100 of an interlock control with a lever 114 with a hook post 114a, a cam 139 and a spring 120

Figure 10C:
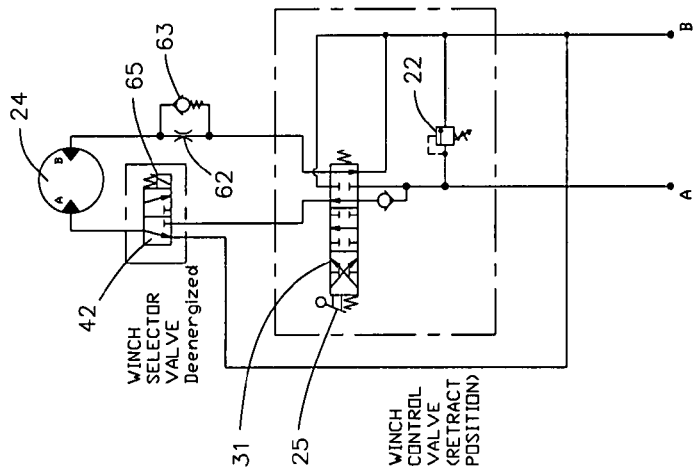
FIG. 10C shows in more detail portions of the schematic of FIG. 9, like in FIG. 10A, in the feed roller engaged mode but with the winch control valve in the retract (forward) position thereof.
Figure 10B:
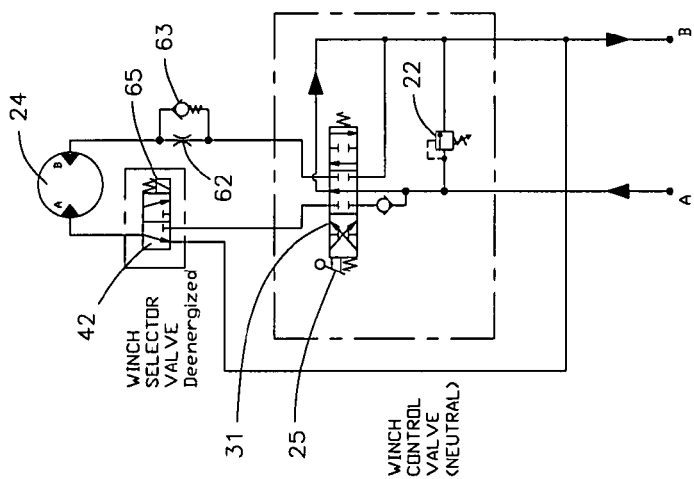
FIG. 10B shows in more detail portions of the schematic of FIG. 9, like in FIG. 10A, in the feed roller engaged mode but with the winch control valve in the neutral position thereof.
Figure 10A:
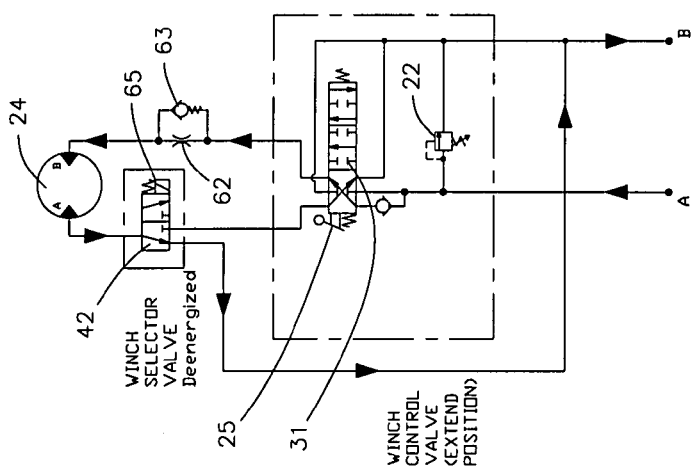
FIG. 10A shows in more detail portions of the schematic of FIG. 9 in the feed roller engaged mode with the winch control valve in the extended (reverse) position thereof.

The winch 110 has rope 115 in FIG. 14 in the winch 110 engaged position of FIG. 10A. Because of the configuration of cam 139, it is difficult to move the hook lever 114 from the solid line position of FIGS. 14 and 15A to the feed roller engaged position of FIG. 15B. So the operator is encouraged to use the winch 110 to move the hook 114 from the FIG. 15A position to the FIG. 15B position to then be able to be in the feed roller engaged position with this embodiment 100.

There are a couple of added steps that the operator has to do in order to engage the winch 110. But the principle is still the same as the embodiment of FIGS. 1-8. It still controls the end of the rope 15, by making sure the operator uses the FIG. 15A mechanism to be able to lock it in to get into the feed mode of FIG. 15B using the winch 110 that pulled the interlock system into the feed mode. The only added step the operator notices is to reverse the winch line 15 from position B to position C in FIG. 15A. FIG. 15A shows that cam 139 is made in such a way that one can over-release it by pressing the lever/hook 114 a little further to position C to release the rope 115 and then, in FIG. 15B, you could slide it back to the FIG. 15A position. So the FIGS. 14, 15A and 15B system operate the switch 19 just as the switch 19 is operated in the schematic of FIG. 15.

Figure 16:
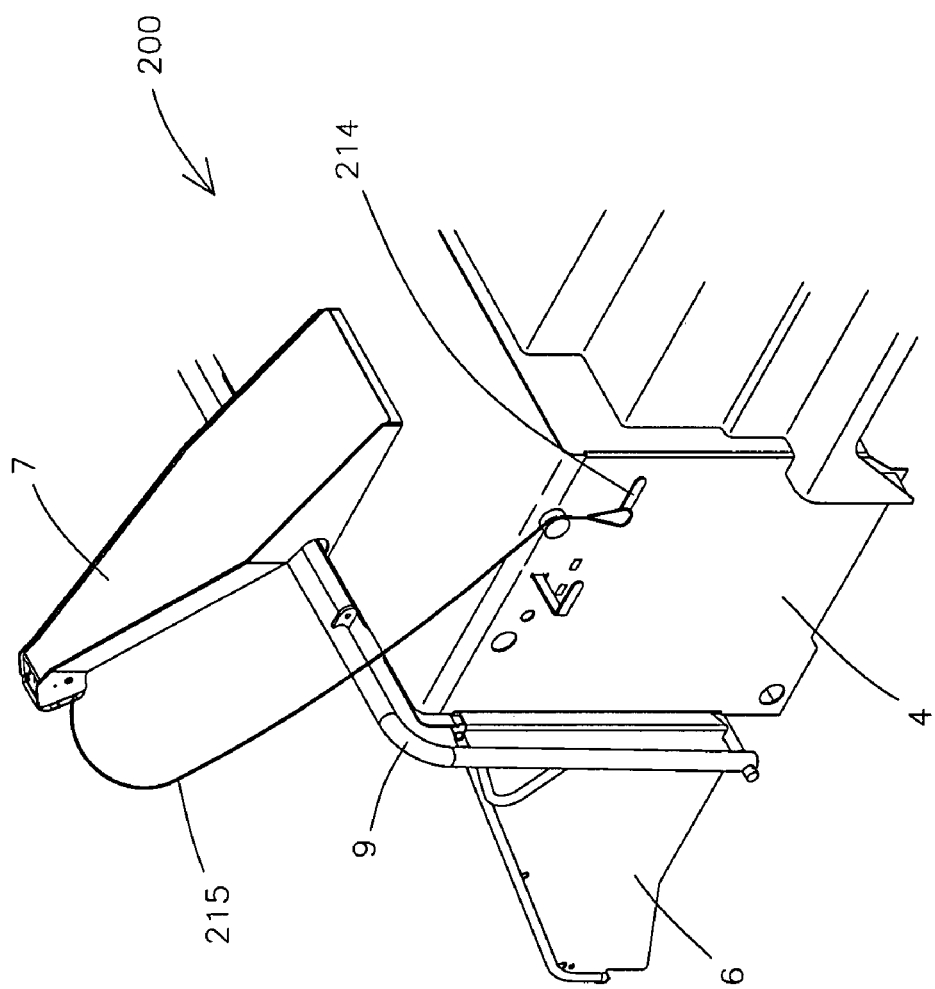
FIG. 16 is perspective view of another alternate embodiment of the present invention showing a winch boom, winch line and interlock mechanism.
Figure 17:
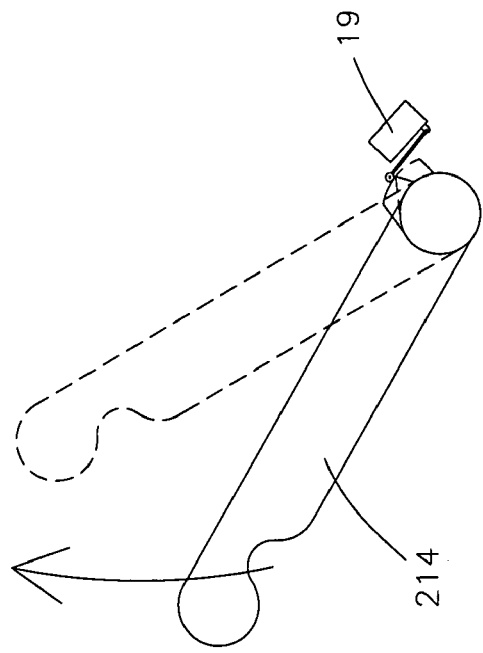
FIG. 17A is a top plan view of the interlock of FIG. 16, shown in solid lines in the winch engaged position thereof.
FIG. 17B is a top plan view of the interlock of FIG. 16, shown in solid lines in the feed roller engaged position thereof, and in dashed lines in a release position that allows the interlock lever to move back to the FIG. 17A position, similar to the way that the FIGS. 14, 15A and 15B embodiment works.
Figure 17A:
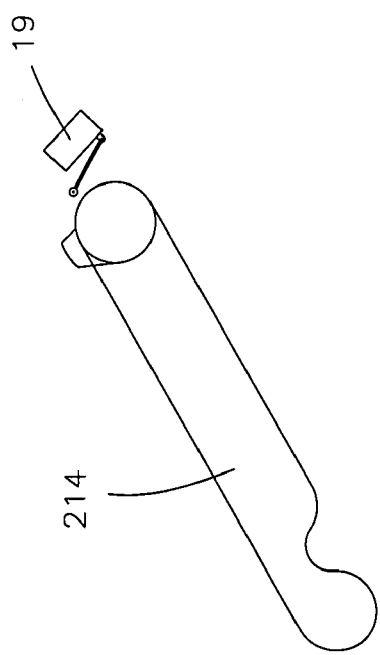

FIGS. 16, 17A and 17B show another alternate interlock system. A rope 215 of winch 210 of FIGS. 17A and 17B would drape that over hook 214 which serves the same purpose as the interlock of FIGS. 15A and 15B. Switch 19 would be actuated like the schematic system of FIG. 9.

The initial concept shown in FIGS. 16, 17A and 17B was to provide an interlock control lever 214 that was difficult to move manually from a Winch Mode position to a Feed Mode position. It was configured to be moved with the winch line itself. This control lever 214 was configured with an over center spring mechanism (not shown) that provided that resistance, while also providing force to hold the lever in the Feed Mode position with a very low force. A similar, but more refined embodiment is shown in FIGS. 14, 15A and 15B as described above. The operation for the embodiments of FIGS. 14, 15A, 15B, 16, 17A and 17B thus include the steps of:

Remove the winch line from the interlock control, move the Feed Control Bar to Neutral, move the Interlock Control lever to the Winch mode position, move the Winch Engage/Disengaged lever to disengage, and pull the winch line out to connect to a log;

Move the winch engage/disengage control to engaged and then pull the log to the chipper with the winch by moving the Winch Retract Lever to Retract;

Disengage the winch line from the log and connect it to the Interlock Control in order to move the Interlock Control to the Feed Mode Position by using the Winch Retract control (note a switch was envisioned to be placed on the Interlock control that would automatically stop the Winch Retract control when the Interlock Control lever reached the Feed Mode position to protect the mechanism from excessive force that the winch line could exert);

Then move the Feed Control Bar to Forward to chip the log;

Once the log is chipped, remove the winch line from the interlock control, move the feed control lever back to Neutral, move the interlock control lever back to the Winch mode position, move the Winch Engage/Disengaged lever to disengage, and pull the winch line out to the next log;

Move the winch engage/disenagage control to engaged and then pull that next log to the chipper.

The desired result of this control was to provide incentive for an operator to position the winch line in the desired location, on the interlock control lever, while brush was being fed. This basic control was intended to function in cooperation with the prior art interlock between the feed control bar and the winch that prevented simultaneous operation of the winch and the feed rollers.

The final configuration included the concept of having a mechanical connection between the interlock control and the clutch engage/disengage control. It was recognized that with this mechanical connection the need for the prior art interlock between winch retract and feed roller feed control could be eliminated. The operation of the final design, shown in FIGS. 1-13 includes the steps of:

Remove the winch line from the interlock control, move the Winch Engage/Disengaged lever to disengage which automatically moves the Interlock Control to the Winch Mode position, and disables the Feed Rollers, and pull the winch line out to connect to a log;

Move the winch engage/disengage control to engaged and then pull the log to the chipper with the winch by moving the Winch Retract Lever to Retract;

Disengage the winch line from the log and connect it to the Interlock Control in order to move the Interlock Control to the Feed Mode Position by using the Winch Retract control (the Interlock control is built strong enough to withstand the maximum retract force that the winch can generate);

Once the Interlock Control is in the Feed Mode position, then the Feed Rollers can be started, using the Hold to Run/Reset Control;

Once the log is chipped the winch line is removed from the interlock control and the Winch Engage/Disengage lever moved to disengage and the process starts over.

Figure 13:
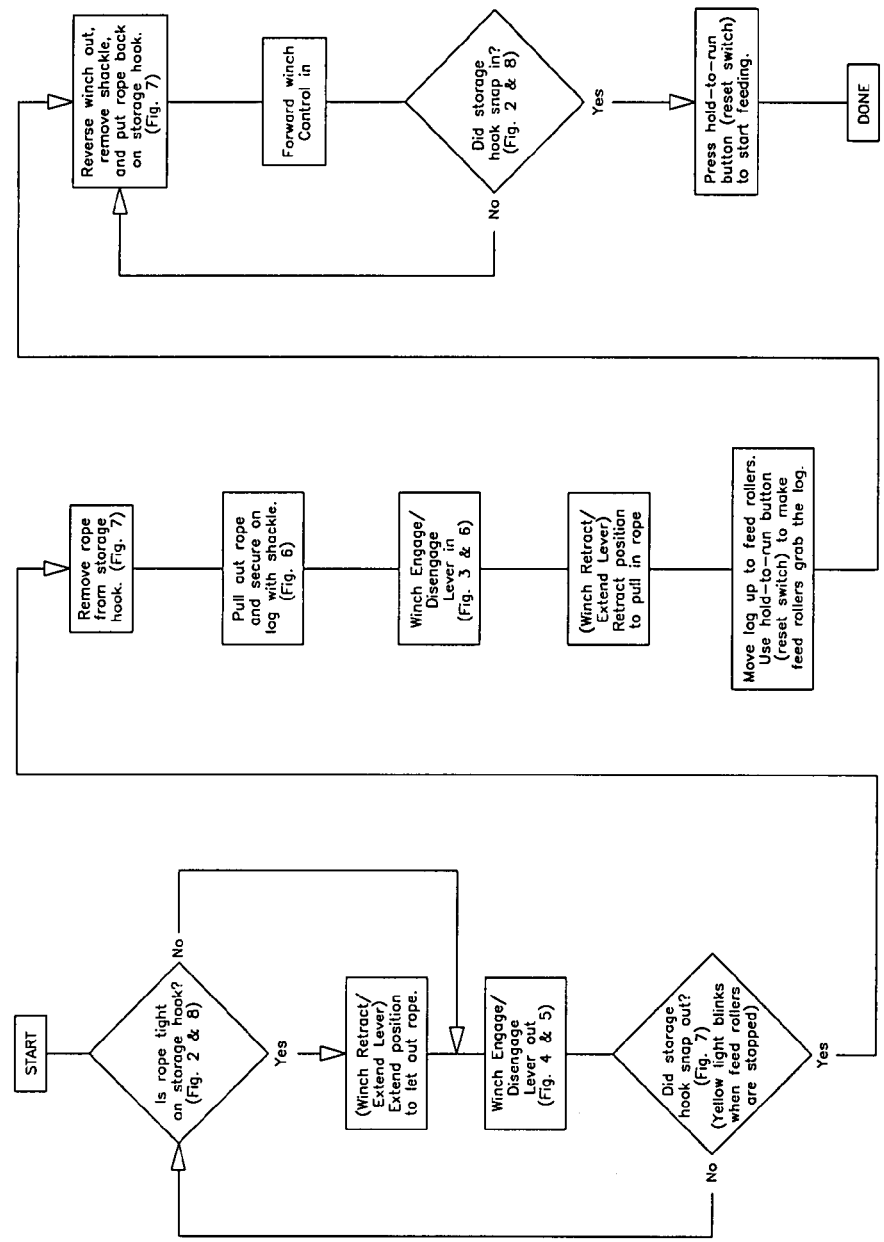
FIG. 13 is a flow chart explaining the operation of the present invention.

Referring now to FIG. 13 it is noted that the winch reverse (extend) is always active. The operator always has reverse and the winch extend out or reverse is metered so that when you reverse it out it's very slow. This slowness is due to the restriction orifice 62 shown in FIG. 9. The very first step in using brush chipper 1 is to reverse the winch line 15. But it is desired that the winch reel 12 not spin too fast. That is done with the hydraulics and restriction orifice 67 mentioned above. It also gives control of the log 41 when it is up top of the feed table. Still referring to the operation shown in FIG. 13, FIG. 2 shows that the rope 15 is tight on the hook; if no, the operator can take the rope 15 right off hook 14 and chip wood. If yes, then the operator will have to use the reverse on the control valve 23 to loosen the rope 15 to get the rope off the end of that hook 14. Then the winch disengage-engage lever 14 (FIG. 2) a clutch lever 16 is pulled out so that the operator can unspool the rope 15 (FIG. 4). If the winch interlock hook 14 snaps out to FIG. 7 or did it slide back into the winch mode of FIG. 8? And did the yellow light blink? If so it went into the feed stop mode. The fee rollers should be stopped at that time. When the yellow light blinks, that indicates that it is in the e-stop mode, meaning that the feed rollers are stopped. At that time the operator can remove the rope 15 from the storage hook 14 (FIG. 7), pull the rope 15 out and secure it on the log 41 as in FIG. 6. With the winch engaged/disengaged lever in the position of FIG. 3A, the operator will use the winch control valve 23 (shown in FIG. 2) and pull the rope 15 in to move the log 41 up into the feed rollers 50 (FIG. 1) and use the hold to run button 12 (FIG. 9) to get the feed rollers 50 to grab and hold the forward end of the log 41.

The hold or run reset switch 12 on this schematic of FIG. 13 does two things. First, in a normal feeding mode the interlock 14 has been activated or tripped, it allows an operator to press that hold to run button 12 and reactivate the feed rollers. Second, in the winch mode, it will only allow an operator to operate the feed roller motors 43, 44 for a brief second. Pressing the hold or run button 12 allows the feed rollers to climb up on the log 41. This corresponds to FIG. 13, in the middle where it says "move the log up to the feed rollers" and "use the hold or run button/re-set switch to make the feed rollers grab the log." After that, reverse the winch 13 out, remove the shackle and put the rope back on the storage hook 14, or an interlock hook 14, and then use the winch 13, using the forward control, pulling the rope 15 all the way in. At that time the operator decides: "did the storage hook snap in" i.e. did it snap back in place shown in FIGS. 2 and 8? Then the operator will press the hold to run button 12 and start feeding because that will de-activate the e-stop system to allow feeding using the feed rollers 5.

Turning now to the hydraulic schematics of FIGS. 10A, 10B and 10C, FIG. 10A shows a feed mode, which means that the winch selector valve of FIG. 9 is de-energized. When the operator goes to the winch reverse or rope extend condition there is always oil available, so the path goes up through the hydraulic motor 24 and back down through the winch selector valve and back down to tank 51. In FIG. 10B, the winch selector valve 42 is in neutral so the oil just goes through the winch control valve 31 from port A to port B. In FIG. 10C if an individual tries to use the winch control valve 31 in forward or pull the rope back in, he cannot because the winch selector valve 42 is de-energized and the oil dead heads. Because it dead heads, it goes up across the relief valve 22 from port A across relief valve down to port B, meaning there will be no motion at all and no winching.

Figure 11C:
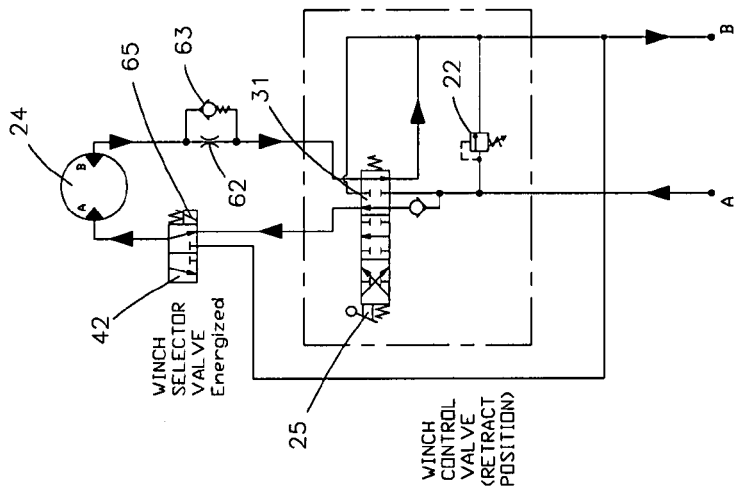
FIG. 11C shows in more detail portions of the schematic of FIG. 9, like FIG. 11A with the winch selector valve energized to the winch enabled mode but with the winch control valve in the retract (forward) position thereof.
Figure 11B:
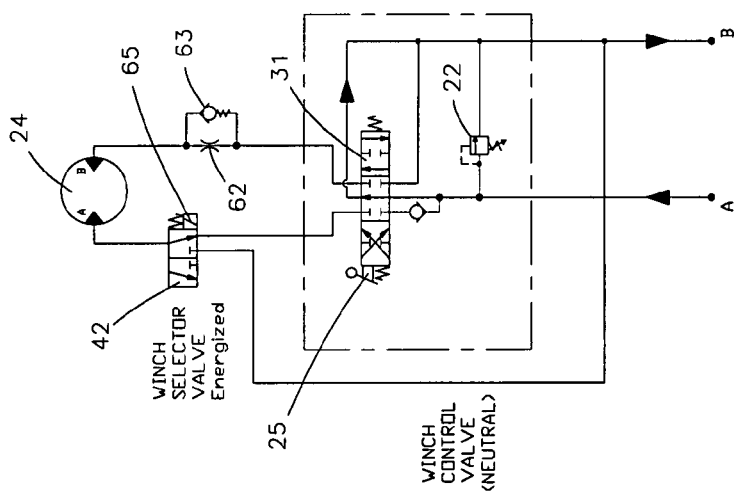
FIG. 11B shows in more detail portions of the schematic of FIG. 9, like FIG. 11A with the winch selector valve energized to the winch enabled mode but with the winch control valve in the neutral position thereof.
Figure 11A:
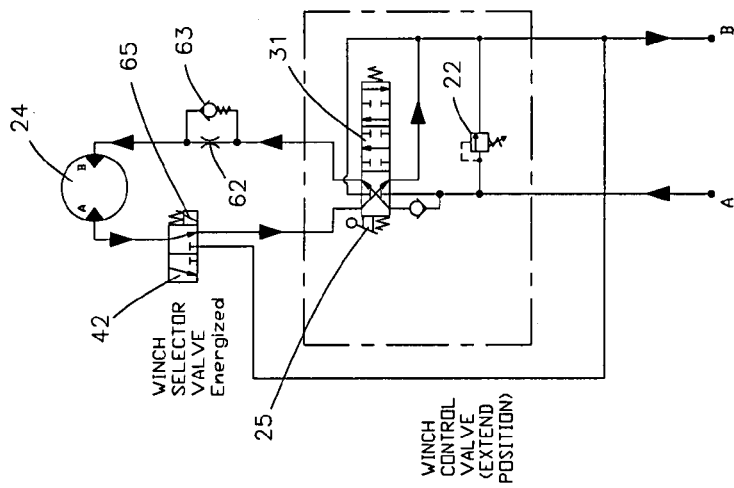
FIG. 11A shows in more detail portions of the schematic of FIG. 9, with the winch selector valve energized to the winch enabled mode and with the winch control valve in the extended (reverse) position thereof.

In FIGS. 11A, 11B and 11C, in the winch mode, the winch selector valve 42 is energized in all three conditions. In FIG. 11A with the winch control valve 31 extended, oil goes in port A, up through the winch selector valve 42, through the orifice 62, through the motor 24, then back through the winch selector valve 42, back through the winch control valve 31, and back out through port B.

In FIG. 11B, with the winch control valve 31 in a neutral condition, the oil just goes through port A through the winch control valve 31 and out port B.

In FIG. 11C, oil goes through port A, through the winch control valve 31, through the winch selector valve 42, through the hydraulic motor 24, around the check valve 63, free flows through the check valve 63, back down through the winch control valve 31 and out port B.

In the FIG. 12 schematic, switch 19 is either a normally open or a normally closed switch. Either provide power, e.g. 12 volts, to the controller 11 or to the winch selector valve solenoid 65, which is either energized or de-energized to go either in a winch mode or feed control mode. Once the circuit has been broken, e.g. the 12-volts have been broken to the controller, then the machine automatically goes to the e-stop mode, the feed rollers 5 have stopped, the lights on the back of the machine 1 go into a blink mode telling the operator that it is e-stop condition. At that time electricity is allowed to go into the winch selector control valve to be able to operate the winch 13. The solenoid 65, shown in FIGS. 11A, 11B, 11C and 12, that operates the winch selector valve 42 allows the oil either to allow the winch motor 24 to turn in a forward position or not.

On FIGS. 2-5 the clutch handle 16 pulls straight out, or pushes straight in. On other models contemplated, the handle 16 actually rotates, and as it rotates it still disengages the clutch 13 and still trips the interlock mechanism 24 the same way. The point being that there are different ways to be able to do that. The handle 16 can pull out, the handle 16 can rotate or the handle 16 can push in or out. These are some of the ways that the disengagement of the clutch 23 and the interlock system including member 14 can be done at the same time.

The above disclosed embodiments are the preferred embodiments, but this invention is not limited thereto. It is apparent that many modifications and variations of the present invention are possible in light of the above teachings. It is therefore to be understood that, within the scope of the appended claims, the invention may be practiced otherwise than as specifically described.

The invention claimed is:

1. A brush chipper comprising:
    a frame;
    a feed system operatively attached to the frame;
    a grinding system operatively attached to the frame;
    a winch operatively attached to the frame;
    a spring biased selector operatively attached to the frame, the spring biased selector having two positions, one position that allows operation of the feed system but not the winch and one position that allows operation of the winch but not the feed system; and
    wherein the selector includes a lever adapted to attach to the end of the winch line such that the winch can be used to move the selector.

2. Apparatus comprising:
    a chipper;
    at least one feed roller operatively attached to the chipper;
    a winch operatively attached to the chipper;
    an interlock control with feed roller disabled position and a feed roller enabled position, spring loaded to the feed roller disabled position, to encourage or require the use of the winch line to move it into a feed roller enable position;
    a winch control that selects between winch freewheel position and winch drive position; and
    a connection between the interlock control and winch control such that the interlock control automatically moves to the feed roller disabled position whenever the winch control is moved to the winch freewheel position.

3. Apparatus comprising:
a chipper;
at least one feed roller operatively attached to the chipper;
a winch operatively attached to the chipper;
an interlock control operatively attached to the chipper;
a winch line hook configured to accept and retain the winch line to allow the winch line to be used to move the interlock control;
a handle to allow an operator to manually move the interlock control;
a spring mechanism to move the interlock control to a feed roller disabled position and to hold it there with a first force adequate to make it difficult for an operator to use the handle to move the handle to the feed roller enabled position; and
the spring mechanism having a second force, when the interlock control has been moved to the feed roller enabled position such that the operator can easily move the interlock control to a release position wherein the winch line can be easily removed from the winch line hook.

4. A method of controlling a brush chipper with at least one feed roller and a winch comprising providing an interlock control with two positions, a first position where the operation of the at least one feed roller is disabled and a second position where the operation of the at least one feed roller is enabled wherein the force to move the interlock control is more than an operator would do manually, and further configuring the interlock control so that the winch line is used to move the interlock control to the second position, said method comprising:
moving the interlock control from the second, feed roller enabled, position to the first, feed roller disabled, position thereof;
using the winch to pull brush towards the at least one feed roller;
using the winch to pull the interlock control from the first position to the second position thereof; and
using the at least one feed roller to feed the brush into the brush chipper.

5. A wood chipper comprising:
a frame;
a cutter mechanism operatively attached to the frame;
a feed housing operatively attached to the frame;
a feed mechanism operatively attached to the frame and extending outwardly from the feed housing for selectively feeding brush to the cutter mechanism;
a feed table extending from the feed housing for supporting brush thereon;
a boom operatively attached to the frame;
a winch, operatively attached to the boom, the winch including a flexible member that extends over the feed table, the winch being adapted to pull brush toward the feed table;
an interlock control with a feed mechanism disabled position and a feed mechanism enabled position, the interlock control being biased to the feed mechanism disabled position to encourage or require the use of the winch line when it is desired to move the interlock control from a feed mechanism disabled position to a feed mechanism enabled position;
a winch control operatively attached to the winch that selects between a winch freewheel position and winch drive position; and
a connection between the interlock control and winch control such that the interlock control automatically moves the feed mechanism to the disabled position whenever the winch control is moved to the winch freewheel position.

6. The wood chipper of claim 5 including an over riding switch that allows the feed mechanism to be manually turned on even when the interlock control is in a feed mechanism disabled position.

7. The wood chipper of claim 6 wherein the over riding switch is a manually operated switch.

* * * * *